United States Patent [19]
Carson

[11] B 3,924,048

[45] Dec. 2, 1975

[54] ROADSTONE

[75] Inventor: John William Carson, North Rigton, England

[73] Assignee: Albright & Wilson Limited, Oldbury, near Birmingham, England

[22] Filed: Aug. 2, 1972

[21] Appl. No.: 277,449

[44] Published under the Trial Voluntary Protest Program on January 28, 1975 as document no. B 277,449.

[30] Foreign Application Priority Data

Aug. 4, 1971  United Kingdom............. 36551/71
Apr. 20, 1972  United Kingdom............. 18318/72

[52] U.S. Cl. ............... 428/404; 106/286; 427/180; 427/215; 427/376

[51] Int. Cl.² .......................................... B32B 19/00

[58] Field of Search ........ 117/100 B, 100 S, 100 M, 117/100 D, 169 R, 169 A, 21, 27, 22, 23; 106/286; 428/404; 427/180, 215, 376

[56] References Cited
UNITED STATES PATENTS

| | | | |
|---|---|---|---|
| 303,568 | 8/1864 | Gould | 106/286 |
| 1,169,506 | 1/1916 | Osgood | 252/1 |
| 2,010,620 | 8/1935 | Wright | 117/100 D |
| 2,298,277 | 10/1942 | Burton | 117/23 |
| 2,703,445 | 3/1955 | Veale | 117/21 |
| 2,974,060 | 3/1961 | Dettling | 117/23 X |
| 3,023,492 | 3/1962 | Bristow | 117/23 X |
| 3,079,243 | 2/1963 | Ueltz | 117/100 B X |
| 3,620,799 | 11/1971 | Hoelscher | 117/22 |

FOREIGN PATENTS OR APPLICATIONS

1,471,415  11/1968  Germany ............................ 117/22

*Primary Examiner*—Harry J. Gwinnell
*Assistant Examiner*—Dennis C. Konopacki
*Attorney, Agent, or Firm*—Flynn & Frishauf

[57] ABSTRACT

It is known to make synthetic roadstone by sintering together hard particles of e.g., chrome residue together with a finely pulverised calcareous or siliceous binder. The invention proposes forming a coated roadstone comprising a granular substrate of e.g., granite having a sintered coating of hard particles of e.g., chrome residue. The invention has the advantage of reducing the more expensive synthetic portion of the stone to provide a cheaper roadstone which nevertheless has substantially the same wear resistance characteristics.

10 Claims, No Drawings

ROADSTONE

BACKGROUND OF THE INVENTION

The present invention relates to roadstone. It is customary to surface roads with natural stones in a resinous, bituminous or cement binder. The surface of the stones soon wears smooth, giving a polished surface which affords inadequate grip to the tyres of traffic.

Attempts have been made to provide stones which do not wear smooth, for example by sintering crushed minerals. We have proposed in our British specification No. 1,337,948, and No. 1,336,712, to use granular sintered mineral by-products or spinels. According to the aforesaid Applications the granules may be formed by sintering together a hard particulate material in the presence of a slag or similar softer binder. The binder wears faster than the harder inclusions so that the surface of the stone is rough even after polishing. One drawback of synthetic sintered stones is their high cost.

We have now discovered that even after many years only a small fraction of the surface of the stone is worn away and that it is possible to provide a roadstone having satisfactory polishing characteristics which consists of a granular refractory stone, coated with a sintered mixture of fine, relatively hard particles in a softer binder. Because the sintered powder composition need comprise only a thin surface layer, with the granular stone providing the greater part of the volume, such stones may be produced significantly more cheaply than wholly synthetic sintered stones while having substantially the same effective resistance to polishing.

BRIEF SUMMARY OF THE INVENTION

Our invention provides a granular refractory roadstone having a diameter of at least 1 mm. and having upon the surface thereof a sintered coating comprising hard refractory particles in a softer siliceous or calcareous matrix.

The granular refractory roadstone may be any granular refractory stone having a diameter of at least 1 mm. and preferably at least 2 mm. and capable of withstanding the sintering temperatures. Preferably it is natural stone such as a refractory igneous or metamorphic rock, e.g., metamorphic grit stone, basalt or granite. Other stones which may be employed include slags, shales, pit residues, concrete, devitrified soda glass, coarse crushed refractory brick, ceramics such as porcelain biscuit and minerals such as chrome ore, iron ore and bauxite.

The coating comprises hard particles which are preferably of a spinel material, such as chrome residue. Chrome residue is the residue left when crushed chromite ore is heated with alkali and lixiviated with water to extract alkali bichromate. Alternatively the particles may be of fine bauxite or a spinel/alumina mixture or finely crushed refractory brick. Generally the particles will have a size of less than 1 mm. and preferably a diameter of from $70\mu$ to $10\mu$. Typically particles are less than 300 but more than $5\mu$ and preferably less than $75\mu$, e.g. $45\mu$ to $20\mu$.

The binder may be a slag, e.g., phosphorus furnace slag, blast furnace slag, cupola slags or copper slag, the "red mud" from aluminium manufacture, clay, pulverised fuel ash, shale, sodium fluosilicate, sodium silicate, olivine or other calcareous or siliceous mineral or slag which is softer and more fusible than the hard particles.

In some instances flux such as calcium fluoride may advantageously be added to the binder, but some binders, e.g., slags and sodium fluosilicate are self fluxing.

DETAILED DESCRIPTION OF THE INVENTION

The granular stones may be coated with a stiff slurry of the hard particles and finely crushed binder in water and the mixture is calcined in a rotary kiln. Alternatively the stones and slurry may be sintered on a moving grate. The mixture may be heated at a temperature sufficient to sinter but not completely fuse the coating preferably 1,000°C to 1,600°C e.g., 1,300°C.

It is preferred, however, to wash the granular substrate and the materials which comprise the coating and to pass a mixture of the damp solids through a rotary kiln. The damp coating materials adhere to the surface of the substrate in the cool part of the kiln and are subsequently dried and sintered as the mixture passes into the hotter end of the kiln.

The overall size of the coated granules may conveniently be between 2mm and 25mm diameter. In order to conform to current road surfacing practice it is preferred that the composition be graded to give either one-eighth inch (2mm) to one-fourth inch (4mm) diameter granules or three-eighths inch (6mm) to three-fourths inch (20mm) diameter granules. Larger granules are however operable. There is no theoretical upper limit to the size of the granules apart from the practical limitations imposed by the kiln and the lack of demand for roadstone having a diameter greater than 25mm. The invention may be extended to provide, for example, coated cobblestones. According to a modification the invention provides slabs of paving stone coated with sintered hard refractory particles in a softer calcareous or siliceous binder. The slabs may be of stone or concrete, coated with a stiff slurry of fine hard particles and binder and sintered in, for example, a tunnel kiln.

The thickness of the coating may conveniently be at least 0.1mm and preferably at least 1mm. Typically the coating may constitute from 1 to 50 percent by weight of the total stone, e.g., 20 percent by weight. The hard particles may constitute from 10 to 90 percent by weight of the coating, preferably 20 – 80 percent by weight.

According to a particular embodiment the granular substrate may be a soft relatively fusible material such as a granular slag or a natural siliceous material (e.g., granite) and the hard particles may be embedded in or caused to adhere to the surface of the substrate. A mixture of the substrate and hard particles may, for example, be heated in a rotary kiln sufficiently to cause local melting of the surface of the substrate and render it sticky without melting the entire body of the substrate. The surface of the substrate granule itself thus functions as the binder for the hard particles of the coating.

Preferably the substrate is mixed with the damp, washed coating particles and passed through the kiln. A particularly preferred product is obtained by employing a substrate material comprising a mixture of crystals of different melting point (e.g., a granite). The coating particles adhere most thickly where the more fusible crystals lie at the surface of the substrate granule, providing a nodular surface of particular value for roadstones.

Preferably the coating is compact and relatively non-porous. For this reason the materials used to form the coating should preferably be free from carbonaceous or similar combustible material which may form an expanded structure on firing.

The invention is illustrated by the following examples.

EXAMPLE I

A coating mixture comprising 75 percent of −75 mesh BS chrome residue and 25 percent clay was made into a thick mud with water. The mud was mixed with 12 mm metamorphised grit stone in proportions of 20 percent coating solids 80 percent grit stone based on the total dry weight. The mixture was fed to a cold rotary kiln, which was then heated slowly to a sintering temperature of 1,300°C. The action of the cold rotary kiln coats the grit stone with the mud and the slow heating first dries the coating and subsequently sinters the coated stone.

EXAMPLE II

A slurry of 80 percent 2mm to 6mm silica chips with 20 percent of −75 BS chrome residue (based on the total dry weight) in water was fed to a cold rotary kiln and slowly heated to 1,300°C as in Example 1. The product comprised silica chips with chrome residue sintered to the surface thereof.

EXAMPLE III

The process of Example 1 was repeated using 12mm basalt as the substrate and a mixture of 25 percent of −75 chrome residue, 50 percent of −300 silica grit and 25 percent clay as the binder.

The products had AAV of from 3 to 8 percent and PSV of 70 to 76.

EXAMPLE IV 80 percent by weight of washed ⅜ inch quartz dolerite was mixed with 20% by weight of damp washed chrome residue and the mixture was passed through a rotary kiln having a maximum temperature of 1,240°C (sufficient to melt the feldspar crystals, which are a constituent of the quartz dolerite, at the surface of the granite granules but not to melt the bulk of the substrate, or the coating). The product had a most satisfactory nodular coating of chrome residue adhering to the surface of the granite granules.

I claim:

1. A roadstone consisting essentially of:
   a. a granular substrate having a particle size of at least 1mm of refractory metamorphic and igneous rocks, slags, shales, pit residues, concrete, devitrified soda glass, coarse crushed refractory brick, chrome ore, iron ore, bauxite or ceramics; and
   b. from 1 to 50 percent by weight of the total stone of a sintered coating upon the said substrate, said coating consisting essentially of hard particles having a diameter of less than 1mm of spinels, bauxite or finely crushed refractory brick.

2. A roadstone according to claim 1 wherein said coating additionally contains from 10 to 90 percent by weight of the coating of a binder of finely pulverised slag, red mud, clay shale, sodium fluosilicate, sodium silicate or olivine.

3. A roadstone as claimed in claim 1 wherein said hard particles have a diameter of from 5 to 300 microns.

4. A roadstone as claimed in claim 3 wherein said hard particles consist essentially of chrome residue.

5. A roadstone as claimed in claim 1 wherein said hard particles consist essentialy of chrome residue.

6. A roadstone according to claim 4 having an overall size of from 2 to 25mm diameter wherein said coating has a thickness of at least 0.1mm.

7. A roadstone as claimed in claim 6 wherein said coating had the thickness of at least 1mm.

8. A roadstone having an overall size of from 2 to 25mm and consisting essentially of granite coated on the surface thereof with from 1 to 50 percent by weight of the total stone of a sintered coating of particles of chrome residue having a diameter of from 10 to 70 microns.

9. A method for the production of roadstone which comprises mixing together a granular substrate having a particle size of at least 1 mm of refractory metamorphic and igneous rocks, slags, shales, pit residues, concrete, devitrified soda glass, coarse crushed refractory brick, chrome ore, iron ore, bauxite or ceramics with from 1 to 50 percent by weight of a coating composition consisting essentially of hard particles having a particle size of between 5 and 300 microns of spinels, bauxite or finely crushed refractory brick, and heating the mixture to a sintering temperature between 1,000°C and 1,600°C.

10. A method according to claim 9 wherein said granular substrate is granite and said coating material is damp chrome residue.

* * * * *